United States Patent [19]
Yuasa et al.

[11] Patent Number: 5,409,766
[45] Date of Patent: Apr. 25, 1995

[54] NONWOVEN FABRIC IN AN ELECTRET STATE AND PROCESS FOR ITS PRODUCTION

[75] Inventors: Haruo Yuasa; Masayuki Mito; Yukihiro Takata; Satoshi Matsuura, all of Kuga, Japan

[73] Assignee: Mitsui Petrochemical Industries, Ltd., Tokyo, Japan

[21] Appl. No.: 137,354

[22] Filed: Oct. 18, 1993

[30] Foreign Application Priority Data

Oct. 19, 1992 [JP] Japan .................................. 4-280076

[51] Int. Cl.$^6$ .................................. D03D 3/00
[52] U.S. Cl. .................................. 428/224; 55/DIG. 39; 156/167; 204/165; 204/168; 204/169; 264/22; 522/155; 428/903; 96/99
[58] Field of Search .................................. 428/224, 903; 264/22; 55/155, DIG. 39; 204/165, 168, 169; 522/155; 156/167

[56] References Cited

U.S. PATENT DOCUMENTS

| | | | |
|---|---|---|---|
| 4,592,815 | 6/1986 | Nakao | 204/165 |
| 4,626,263 | 12/1986 | Inoue et al. | 55/155 |
| 4,917,942 | 4/1990 | Winters | 428/286 |
| 5,206,061 | 4/1993 | Ando et al. | 428/903 |

FOREIGN PATENT DOCUMENTS

| | | |
|---|---|---|
| 0246811 | 11/1987 | European Pat. Off. . |
| 0512764 | 11/1992 | European Pat. Off. . |
| 59-023098 | 5/1984 | Japan . |
| 02-197110 | 8/1990 | Japan . |

*Primary Examiner*—James J. Bell
*Attorney, Agent, or Firm*—Sherman and Shalloway

[57] ABSTRACT

The improved nonwoven fabric in an electret state is composed of monofilaments with an average fiber diameter of 0.5–100 μm that are formed of a polymer composition containing no more than 1 mol % of polar groups; the fabric has a weight of 5–100 g/m$^2$, a bulk density of 0.05–0.40 g/cm$^3$ and an average surface charge density of at least $0.1 \times 10^{-9}$ C/cm$^2$. This nonwoven fabric is capable of efficient dust collection and its trapping ability is retained for a prolonged time even in a hot and humid condition. Also disclosed are a process for producing this nonwoven fabric, as well as a filtering and an air masking material which are composed of that nonwoven fabric.

19 Claims, 1 Drawing Sheet

NONWOVEN FABRIC IN AN ELECTRET STATE AND PROCESS FOR ITS PRODUCTION

BACKGROUND OF THE INVENTION

1. Field of the Invention

This invention relates to a nonwoven fabric in an electret state and a process for its production, as well as a filter material and an air masking material that are made of said nonwoven fabric in an electret state. More particularly, this invention relates to a nonwoven fabric in an electret state that is capable of efficient dust collection and which retains its high collecting performance even under hot and humid conditions. The invention also relates to a process for producing that nonwoven fabric in an electret state, as well as a filter material and an air masking material that are made of said nonwoven fabric.

2. Description of the Related Arts

A polyolefin, for example, a polypropylene is formed into a nonwoven fabric by melt-blow method, which is given a high DC voltage to produce a nonwoven fabric in an electret state. Methods of producing nonwoven fabrics in an electret state by this process are taught in Unexamined Published Japanese Patent Application (kokai) Nos. Sho 60-168511, Hei 2-197110, etc.

Polyolefins modified with at least one monomer selected from among unsaturated carboxylic acids and derivatives thereof can be turned into electrets by processes such as one that is taught in Examined Japanese Patent Publication (kokoku) No. Sho 59-23098. However, the only examples that are described in this publication refer to the measurement of the charge retaining ability of the film electret.

Speaking of the nonwoven fabric in an electret state which is produced by the methods described in Unexamined Published Japanese Patent Application (kokai) Nos. Sho 60-168511, etc., if it is used as a filter, not only is its ability to collect fine dust insufficient in the initial period but retainment of its collecting performance is also poor in a hot and humid atmosphere.

BRIEF SUMMARY OF THE INVENTION

The present invention has been accomplished under these circumstances and has as its first object providing a nonwoven fabric in an electret state that is capable of efficient dust collection in the initial period and which retains its high collecting performance even under hot and humid conditions.

The second object of the present invention is to provide a process for producing the nonwoven fabric in an electret state.

The third object of the present invention is to provide a filter material that is made of the nonwoven fabric in an electret state.

The fourth object of the present invention is to provide an air masking material that is made of the nonwoven fabric in an electret state.

The first object of the present invention is attained by a nonwoven fabric in an electret state that is composed of monofilaments of a polymer composition that contains no more than 1 mol % of polar groups, said monofilaments have an average fiber diameter of 0.5–100 μm and said fabric has a weight of 5–100 g/m$^2$, a bulk density of 0.05–0.40 g/cm$^3$ and an average surface charge density of at least $0.1 \times 10^{-9}$ C/cm$^2$.

According to its first embodiment, the present invention provides a nonwoven fabric in an electret state in which the polymer composition is a polyolefin that has been modified with at least one modifying monomer selected from among unsaturated carboxylic acids and derivatives thereof.

According to its second embodiment, the present invention provides a nonwoven fabric in an electret state in which the polymer composition comprises not only a polyolefin that has been modified with at least one modifying monomer as selected from among unsaturated carboxylic acids and derivatives thereof but also an unmodified polyolefin.

The present invention also provides a process for producing the nonwoven fabric in an electret state, which comprises the steps of forming a polymer composition containing no more than 1 mol % of polar groups into a nonwoven fabric by a melt-blow method and then applying a DC voltage to the nonwoven fabric to create electrets.

The third object of the present invention is attained by a filter material that is made of the nonwoven fabric in an electret state.

The fourth object of the present invention is attained by an air masking material that is made of the nonwoven fabric in an electret state.

DETAILED DESCRIPTION OF THE INVENTION

Figure 1:
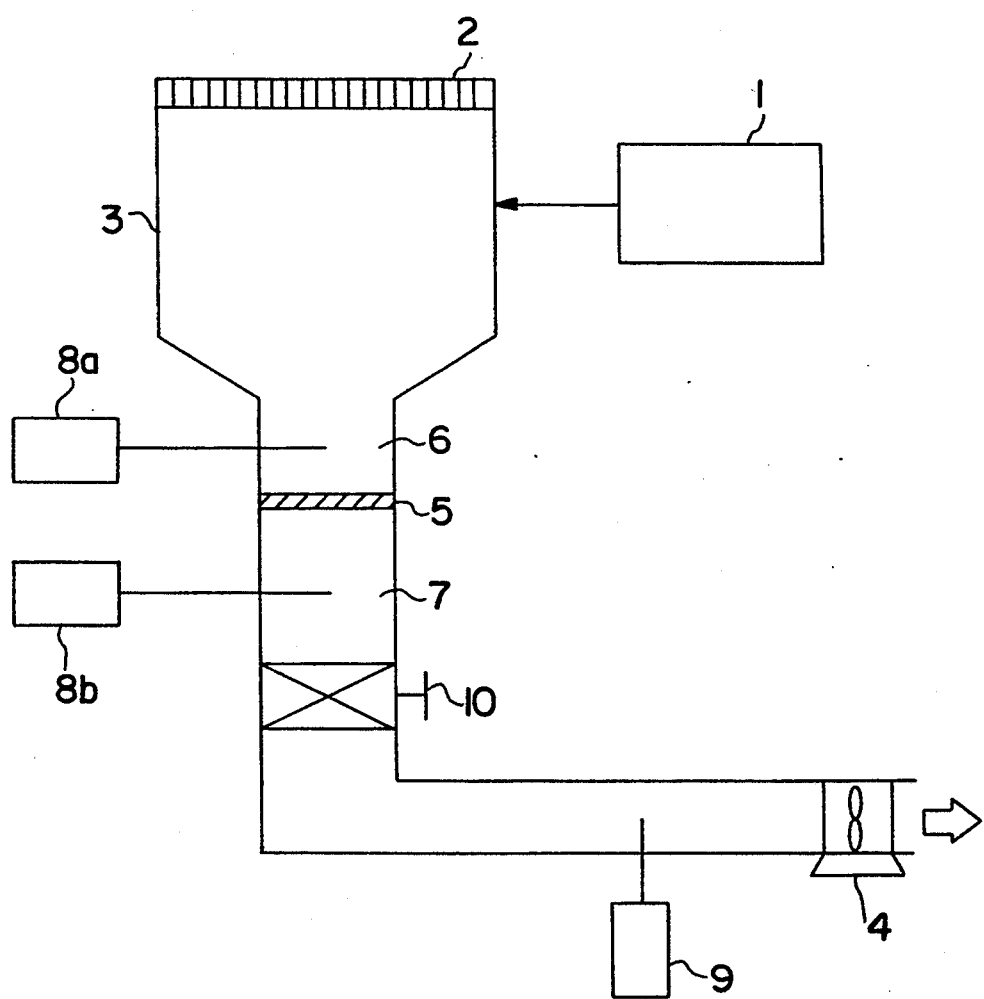
FIG. 1 is a diagram showing schematically the layout of an apparatus that was used to measure the trapping efficiency of filter samples prepared in the Examples of the present invention.

On the pages that follow, the nonwoven fabric in an electret state, the process for its production, as well as the filter material and the air masking material that are made of that nonwoven fabric in an electret state are described in detail.

The nonwoven fabric in an electret state according to the present invention is composed of monofilaments that are made from a polymer composition containing polar groups. The polymer composition is in no way limited as long as it has a polymer containing polar groups and may be exemplified by the following:

(A) a copolymer consisting of a monomer having polar groups and a nonpolar monomer;
(B) a polymer having polar groups introduced into side chains or the backbone chain of a nonpolar polymer by means of oxidation or halogenation;
(C) a graft modified polymer having a polar group containing monomer graft copolymerized onto a nonpolar polymer or the polymer (B); and
(D) a mixture of a nonpolar polymer and at least one member selected from among the polymers (A), (B) and (C).

Polymer compositions that contain mixtures of two or more of the polymers (A)–(D) as major components can also be used in the present invention.

Examples of the polar groups that can be possessed by the polymer composition in the present invention include halogen atoms such as chlorine, fluorine, bromine and iodine atoms and atomic groups such as carbonyl and nitro groups; and groups represented by the following formulae:

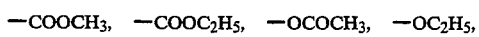

—COOCH$_3$, —COOC$_2$H$_5$, —OCOCH$_3$, —OC$_2$H$_5$,

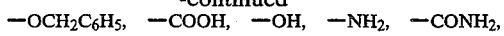

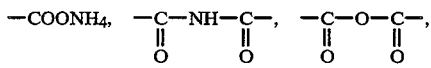

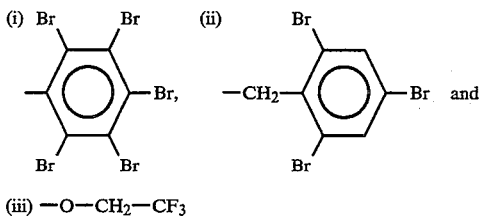

One or more of these polar groups may be contained in the polymer composition under consideration.

Specific examples of the copolymer (A) which consists of a monomer having polar groups and a nonpolar monomer include copolymers of α-olefins such as ethylene and propylene with pentabromophenyl methacrylate having groups represented by the formula (i), or 2,4,6-tribromophenyl methacrylate having groups represented by the formula (ii), or trifluoroethyl methacrylate having groups represented by the formula (iii).

Specific examples of the polymer (B) which has polar groups introduced into side chains or the backbone chain of a nonpolar polymer by means of oxidation or halogenation include polyolefins such as polyethylene and polypropylene that have carbonyl or nitro groups formed in the molecule by a suitable treatment such as oxidation through reaction with ozone, nitrogen monoxide, etc. or surface oxidation through corona discharge, as well as polyolefins that have chlorine atoms introduced into the molecule by chlorination.

Specific examples of the graft modified polymer (C) which has a polar group containing monomer graft copolymerized onto a nonpolar polymer include polyolefins that have been modified with at least one modifying monomer selected from among unsaturated carboxylic acids or derivatives thereof, as well as those which contain not only polyolefins that have been modified with at least one modifying monomer selected from among unsaturated carboxylic acids or derivatives thereof but also unmodified polyolefins.

According to the nonwoven fabric in an electret state of the present invention, the content of polar groups in the polymer composition is no more than 1 mol % preferably 0.5 mol % and below, more preferably 0.03–0.1 mol %.

Embodiments of the present invention are described below with reference to the case where the polymer composition as the main component of the nonwoven fabric in an electret state is made of the graft modified copolymer (C) which may be either a polyolefin that has been modified with at least one modifying monomer selected from among unsaturated carboxylic acids or derivatives thereof, or a polyolefin composition that contains not only this modified polyolefin as a polymer having polar groups but also an unmodified polyolefin. If the polyolefin composition is to be used as the main component of the nonwoven fabric in an electret state, the modified polyolefin may be the same as or different in kind from the unmodified polyolefin.

The polyolefin which is the major component of the modified polyolefin or the polyolefin composition is either a homopolymer of α-olefin, a copolymer of two or more α-olefins, or a mixture of two or more members selected from among these homo- and copolymers. Exemplary α-olefins include ethylene, propylene, 1-butene, 1-pentene, 1-hexene, isopentene, 4-methyl-1-pentene, 3-methyl-1-pentene, 1-octene, 1-decene, 1-hexadecene, 1-octadecene, 1-eicosene, etc.

Specific examples of the polyolefin under consideration include polyethylene, polypropylene, poly(1-butene), poly(4-methyl-1-pentene), ethylene-propylene copolymer, ethylene-1-butene copolymer, ethylene-4-methyl-1-pentene copolymer, propylene-1-butene copolymer, and 4-methyl-1-pentene-1-decene copolymer. Among these polyolefins, polypropylene, poly(1-butene) and poly(4-methyl-1-pentene) are preferred because of high strength and ease in adjustment to an appropriate melt viscosity and in shaping by the melt-blow process. The most preferred is polypropylene since it is inexpensive, can be easily shaped and because it can be readily turned into an electret.

To insure that it will exhibit a suitable degree of flow characteristics to thereby facilitate the production of high-strength nonwoven fabrics by melt-blow method, the polyolefin under consideration has typically an intrinsic viscosity [η] in a range of 0.5–3 dl/g, preferably 0.7–1.5 dl/g, most preferably 0.8–1.3 dl/g. These values of intrinsic viscosity [η] were obtained by measurements in Decalin at 135° C.

A particularly preferred example of the modified polyolefin or the unmodified polymer which is another major component of the polyolefin composition under consideration is a resin composition that consists of 98–40 wt % of polypropylene (a) and 2–60 wt % of an ethylene-α-olefin copolymer (b) having a density of less than 0.900 g/cm³ and a crystallinity of less than 40%, preferably 5–40% as measured with X-rays, with the sum of (a) and (b) being 100 wt %. Using this resin composition, one can produce a nonwoven fabric having a good balance between strength and thermal processability.

The modified polyolefin or the one which is a major component of the polyolefin composition is prepared by graft modifying a polyolefin with at least one modifying monomer as selected from among unsaturated carboxylic acids and derivatives thereof.

The polyolefin which is the major component of the modified polyolefin may be exemplified by homopolymers of α-olefins such as ethylene, propylene, 1-butene, 1-pentene, 1-hexene, isopentene, 4-methyl-1-pentene, 3-methyl-1-pentene, 1-octene, 1-decene, 1-hexadecene, 1-octadecene and 1-eicosene, as well as copolymers of two or more these α-olefins. Specific examples of polyolefins include polyethylene, polypropylene, poly(1-butene), poly(4-methyl-1-pentene), ethylene-propylene copolymer, ethylene-1-butene copolymer, ethylene-4-methyl-1-pentene copolymer, propylene-1-butene copolymer, and 4-methyl-1-pentene-1-decene copolymer. Among these polyolefins, those which are the same as the unmodified polyolefins or those having good miscibility with them are preferably used. For example, if polypropylene is used as the unmodified polyolefin, it is preferred to use polypropylene as the starting polyolefin for preparing the graft modified polyolefin.

The unsaturated carboxylic acids or derivatives thereof that are used as modifying monomers include, for example, unsaturated carboxylic acids, as well as anhydrides, esters, amides, imides and chlorides thereof.

Specific examples of unsaturated carboxylic acids or derivatives thereof include: acrylic acid, methacrylic acid, vinylacetic acid, ethyl acrylic acetic acid, 2,4-pentadienic acid, carboxystyrene, maleic acid, fumaric acid, itaconic acid, citraconic acid, allylsuccinic acid, mesaconic acid, glutaconic acid, nadic acid, methylnadic acid, tetrahydrophthalic acid, methyl acrylate, ethyl acrylate, butyl acrylate, methyl methacrylate, ethyl methacrylate, butyl methacrylate, monomethyl maleate, dimethyl maleate, monoethyl maleate, diethyl maleate, monomethyl fumarate, dimethyl fumarate, monoethyl fumarate, diethyl fumarate, monomethyl citraconate, dimethyl citraconate, monoethyl citraconate, diethyl citraconate, nadic acid monomethyl ester, nadic acid dimethyl ester, nadic acid monoethyl ester, nadic acid diethyl ester, glycidyl acrylate, glycidyl methacrylate, maleic anhydride, itaconic anhydride, citraconic anhydride, methylhexahydrophthalic acid, 3,6-endomethylenephthalic anhydride, methyltetrahydrophthalic anhydride, acrylamide, methacrylamide, maleic acid monoamide, maleic acid diamide, maleic acid-N-monoethylamide, maleic acid-N,N-diethylamide, maleic acid-N-monobutylamide, maleic acid-N,N-diethylamide, fumaric acid monoamide, fumaric acid diamide, fumaric acid-N-monoethylamide, fumaric acid-N,N-diethylamide, fumaric acid-N-monobutylamide, fumaric acid-N,N-dibutylamide, maleimide, N-butylmaleimide, N-phenylmaleimide, sodium acrylate, sodium methacrylate, potassium acrylate and potassium methacrylate. These unsaturated carboxylic acids and derivatives thereof may be used either alone or in admixtures. Among these compounds, maleic anhydride is preferably used.

The modifying monomers listed above are grafted onto polyolefins to prepare modified polyolefins. To this end, various known methods may be adopted. For example, a polyolefin to be modified and a modifying monomer may be reacted by heating at an elevated temperature in the presence or absence of a solvent with or without the addition of a radical initiator. The reaction may be carried out in the presence of another vinyl monomer such as styrene.

The content of the modifying monomer in the modified polyolefin, namely, its graft ratio, is typically no more than 3 mol %, preferably no more than 1.5 mol %. In a special case like using the modified polyolefin as the sole component of a nonwoven fabric in an electret state, the graft ratio is preferably no more than 1 mol %.

The modified polyolefin has typically an intrinsic viscosity (at 135° C. in Decalin) of 0.1–3.0 dl/g, preferably 0.3–2.0 dl/g, more preferably 0.5–1.5 dl/g. These values are selected in order to facilitate uniform mixing with unmodified polyolefins (if they are to be used at all) and to provide sufficient flow characteristics to permit easy manufacture of nonwoven fabrics by meltblow method.

The proportions of the modified polyolefin and unmodified polyolefin in the polyolefin composition are typically in the range from about 0.1:99.9 to about 20:80, preferably from about 1:99 to about 5:95, in terms of weight ratio.

On the condition that the objects of the present invention should not be impaired, various additives may be incorporated in the modified polyolefin or polyolefin composition (in the case of the polyolefin composition, additivies other than the aforementioned modified polyolefins and unmodified polyolefins may be incorporated). Exemplary additives that can be used include antioxidants, uv absorbers, pigments, dyes, nucleating agents, fillers, slip agents, antiblocking agents, lubricants, flame retardants and plasticizers.

The polyolefin composition under consideration can be prepared by various conventional procedures. In one typical method, the aforementioned modified polyolefin and unmodified polyolefin, as well as various optional additives are mixed and subsequently melt blended. Exemplary mixing machines that can be used include a ribbon blender, a twin-cylinder blender, a tumbler and a Henshel mixer. The mixture may be melt blended by various means such as a single-screw or twin-screw extruder, a Banbury mixer, a kneader or a twin-roll mill.

The nonwoven fabric in an electret state of the present invention can be produced by the following procedure. First, the modified polyolefin, either alone or processed into a polymer composition like the polyolefin composition described herein, is fed into an extruder or any other suitable machine, in which it is heated to melt and blended. The blend is then extruded through a plurality of orifices in a melt blowing die as fine resin streams. The extruded resin streams are brought into contact with a high-velocity heated gas stream, whereupon they cool down and solidify into discrete filaments of fine diameter. The fibers are then collected on a porous support.

The temperature for heating the modified polyolefin, either alone or processed into the polyolefin composition, so that it is melted and blended may be adjusted as appropriate depending on the melting point of the polyolefin which is the major component of the modified polyolefin or polyolefin composition. Heating is preferably conducted at temperatures in the range from about 200° to about 350° C., more preferably in the range from 220° to 300° C. These values are selected for the following two reasons: first, the polyolefin will not degrade into a lower molecular weight but a nonwoven fabric having satisfactory mechanical strength can be produced; second, the modified polyolefin or the polyolefin composition is melted at an appropriate temperature to permit easy melt forming.

The throughput on the melt blending and extruding steps is typically in the range from about 10 to about 130 kg/h.

The melt blowing die has in the lip portion a number of small orifices through which the molten modified polyolefin, either alone or processed into the polyolefin composition, will be extruded. The orifices are typically 1000–2000 mm wide; 800–3000 orifices are usually formed in the lip portion and their diameter is typically about 0.5 mm.

The molten modified polyolefin or polyolefin composition being extruded from the melt blowing die contacts the high-velocity heated gas and the streams of molten resin composition are divided into smaller portions. At the same time, they are drafted in the molten state to be stretched in the direction of fiber length, and become even smaller in fiber diameter. To this end, the melt blowing die is equipped with a device for introducing the high-velocity heated gas stream so that it contacts the molten polyolefin composition, either within or outside the die, to form fine discrete monofilaments. The device may be of such a type that blow-off ports for the heated air stream are provided within the die; alternatively, the device may have such blow-off ports provided to insure that the heated gas stream is blown against the molten polyolefin composition in a position outside the lip of the die.

The type of heated gas is in no way limited and heated air is typically used for economic reasons; however, heated inert gases may be used to prevent the deterioration of resins. The temperature of the heated gas is typically 200°–360° C. preferably 230°–310° C., on the condition that it is higher than the temperature of the molten polyolefin composition by at least about 10° C. The flow rate of the heated gas stream is typically in the range from about 100 to about 600 m/sec, preferably from about 200 to about 400 m/sec.

The fine discrete monofilaments being extruded from the melt blowing die may be collected on a porous support to form a web of melt-blown nonwoven fabric. The porous support may be a mesh structure that is made of stainless steel, polyesters and other suitable materials.

The melt-blown nonwoven fabric thus formed is subsequently given a DC voltage to be converted to an electret state. The value of DC voltage to be applied should be selected as appropriate depending upon factors in two categories, one relating to the electrodes to be used and including their shape and the distance between themselves, and the other category relating to the nonwoven fabric in an electret state and including the quantity of electric charges to be produced and the required processing speed. If, for example, the distance between electrodes is 8 mm, a DC voltage of at least 5 kV, preferably 6–20 kV, may be applied to the melt-blown nonwoven fabric.

The DC voltage can be applied by any methods without particular limitations. Exemplary application methods include: passing the melt-blown nonwoven fabric between a pair of electrodes to which a DC voltage is being applied; applying a corona discharge or a pulsed high voltage to the surface of the nonwoven fabric; applying a high DC voltage to both surface of the nonwoven fabric as they are held by another dielectric; and applying voltage to the nonwoven fabric under exposure to light.

The nonwoven fabric in an electret state thus produced in accordance with the present invention has preferably a weight in the range from 5 to 100 g/m$^2$, more preferably from 10 to 80 g/m$^2$ in order to insure that the fabric will permit appropriate air permeation and have high strength while causing only limited local variations in weight. The monofilaments in the nonwoven fabric have preferably an average fiber diameter of 0.5–100 μm, preferably 0.5–10 μm, more preferably 1–6 μm in order to insure that the fabric will permit appropriate air permeation while it is capable of collecting fine dust particles with high efficiency. The fiber length is typically in the range from about 50 to about 400 mm. The term "average fiber diameter" as used herein means the value determined by the following procedure: an electron micrograph (X500) is taken for the surface of a fiber sample; 30 filaments are selected randomly on the micrograph and the diameters of those filaments are individually measured with a suitable device such as a vernier caliper; the measured values of the diameters of individual filaments are averaged by calculation.

The nonwoven fabric in an electret state under consideration has typically an average surface charge density of at least $0.1 \times 10^{-9}$ C/cm$^2$, preferably $0.5–5 \times 10^{-9}$ C/cm$^2$. If the quantity of charges that can be produced by the fabric is too small, it will not be able to work as satisfactory electrets. If the quantity of charges is too large, diseconomy will result since the performance of the fabric in dust collection substantially levels off beyond a certain quantity of charges.

The nonwoven fabric in an electret state has typically a bulk density of 0.05–0.40 g/cm$^3$, preferably 0.06–0.20 g/cm$^3$ because with such values of bulk density, the fabric will have a sufficient strength to permit easy handling while assuring adequate air permeation.

The thickness of the nonwoven fabric in an electret state is determined in accordance with its weight and bulk density and it is typically in the range from about 0.05 to about 2 mm.

The polymer composition forming the monofilaments which are the main component of the nonwoven fabric in an electret state has typically an intrinsic viscosity [η] of 0.3–1.5 dl/g, preferably 0.5–1.0 dl/g as measured at 135° C. in Decalin.

The nonwoven fabric in an electret state of the present invention may be used either as such or after it is laminated with a reinforcing layer on at least one side. Lamination with a reinforcing layer will impart higher strength and rigidity to the fabric. This is preferred since pleating and other processing operations can be performed efficiently when manufacturing a filter from the nonwoven fabric in an electret state and because the produced filter can be prevented from deforming under air drag. If reinforcing layers are to be used, they may be selected from among woven fabrics, nonwoven fabrics, nets, etc. that are formed of paper or synthetic resins such as polyethylene terephthalate, nylon and polypropylene.

The nonwoven fabric in an electret state under consideration has high charge density in the initial period; in addition, it will release only a limited quantity of charges even if it is left in hot and humid conditions. Therefore, it can advantageously be used as an air filter in a hot and humid atmosphere; not only does it have high initial trapping capability but its performance will last for a prolonged time to guarantee a longer service life as filter.

This nonwoven fabric in an electret state can be produced at low cost in accordance with the method of the present invention.

One of the most advantageous uses of this nonwoven fabric is in an air filter in order to fully exploit its high trapping ability, especially the longevity of the life of its use under hot and humid conditions. Areas of the use of the nonwoven fabric in an air filter include air conditioners, air cleaners, vacuum cleaners, fan heaters and the interior of automobiles. The nonwoven fabric can also be used advantageously as an industrial or household air mask to be put over the mouth and nose.

In accordance with the third and fourth aspects of the present invention, there are provided a filtering and an air masking material that are made of the nonwoven fabric in an electret state which has been described hereinabove. Obviously, these materials have high initial trapping efficiency and their trapping performance is retained for a prolonged time under hot and humid conditions.

The filtering material made of the nonwoven fabric in an electret state can advantageously be used as an air filter in air conditioners, air cleaners, vacuum cleaners, fan heaters and inside automobiles in order to reject fine dust particles.

This filtering material can be produced by various methods, some of which are listed below: i) the nonwoven fabric in an electret state is .set in a frame that is made of a metal, paper, a nonwoven fabric, a thermosetting resin or a thermoplastic resin; ii) the nonwoven fabric in an electret state is fixed with an adhesive or by hot melting; iii) the nonwoven fabric in an electret state is pleated and fixed in a frame made of one of the materials listed above i).

The filtering material will prove particularly useful as an air filter in a hot and humid condition since not only does it have high initial trapping ability but also its performance is retained for a prolonged time, thereby quaranteeing a long service life.

The air masking material which is made of the nonwoven fabric in an electret state may be used advantageously as both an industrial and household air mask to be put over the mouth and nose in order to reject fine dust particles and microorganisms such as bacteria and viruses.

The air masking material can be produced by laminating the nonwoven fabric in an electret state with a suitable material such as another nonwoven fabric and then cutting the assembly into a desired shape.

Having high trapping ability, this air masking material can accomplish further decrease in pressure loss, thereby providing a mask that can be worn for a prolonged time without causing any difficulty in breathing by the wearer.

SPECIFIC EXAMPLES OF THE INVENTION

The following examples are provided for the purpose of further illustrating the present invention but are in no way to be taken as limiting and various modifications of these examples can be made on the condition that they should not depart from the scope and spirit of the invention.

EXAMPLE 1

Ninety-seven parts by weight of polypropylene A having a density of 0.91 g/cm$^3$ and MFR (melt flow rate) of 800 g/10 min (ASTM D 1238) and 3 parts by weight of maleic anhydride modified polypropylene B (maleic anhydride grafted in an amount of 2.7 wt %; intrinsic viscosity, 0.3 dl/g) were mixed in a tumble mixer to prepare a polyolefin composition I. This composition I contained maleic anhydride in an amount of $3.9 \times 10^{-2}$ mol %. It was fed into a single-screw extruder (65 mm$\phi$), melted at 310° C. and extruded from a melt blowing die (connected to the distal end of the extruder) in a yield of 20 kg/h as the extruded filaments were taken up at a speed of 13 m/min to form a melt-blown nonwoven fabric. The melt blowing die was 1.3 m wide and had shaping orifices bored in two rows over the entire width. The die was also supplied with heated (320° C.) air at a flow rate of 500 m$^3$/h.

The melt-blown nonwoven fabric had a width of about 0.25 mm, a weight of 20 g/m$^2$ and a bulk density of 0.085 g/cm$^3$. Filaments in the nonwoven fabric were examined under a microscope and their average fiber diameter was found to be 4 μm. The resin forming these filaments had an intrinsic viscosity [η] of 0.58 dl/g.

The melt-blown nonwoven fabric was then converted to an electret state by passing it continuously under an electrode assembly at a speed of 20 m/min with a DC voltage of −18 kV being applied. The assembly consisted of needle electrodes that were arranged in two rows at intervals of 12 mm in the longitudinal direction.

The melt-blown nonwoven fabric thus converted to an electret state ,was measured for the average quantity of surface charges, which was found to be $1.2 \times 10^{-9}$ C/cm$^2$. The measurement was conducted with a surface charge density meter of the Institute of Physical and Chemical Research by keeping an electrode probe (1 cm$^2$) in contact with the surface of the fabric.

A plurality of samples (30×30 cm) were cut from the fabric and worked into filters, which were then measured for the trapping efficiency by the method to be described below. Another group of similarly prepared filters were placed in a thermohygrostatic chamber (80° C.×90% r.h.) and left there for a predetermined period of time. Five samples were taken out of the chamber 84 h later and another five were taken out 305 h later. Those samples were conditioned in the laboratory at 23° C. and 50% r.h. Their trapping efficiency was measured by the same method as applied to the virgin samples. The results of measurements are shown in Table 1 in terms of the average of measurements on five samples for both 84 and 305 h.

Measuring the trapping efficiency

Measurements of trapping efficiency were conducted with an apparatus having the construction shown in FIG. 1. First, NaCl particles (0.3 μm in size) from an aerosol generator 1 (product of Nippon Kagaku Kogyo K.K.) were fed into a chamber 3 that was supplied with clean air via an air filter 2. When the concentration of NaCl in the chamber 3 leveled off (2−6×10$^6$ particles/cm$^3$), suction was applied in the direction of arrow A by means of an aspirator 4 via a filter sample 5 placed on the bottom of the chamber 3. When the velocity of air passing through the filter became constant (v=10 cm/sec), Cin and Cout, which were the concentrations of NaCl particles in areas 6 and 7 that were upstream and downstream of the filter sample 5, were measured with particle counters 8a and 8b, respectively. Both counters were Model KC-01B of Rion Co., Ltd. The trapping efficiency (E) of the filter sample 5 was determined by the following equation:

$$E = (1 - Cout/Cin) \times 100\ (\%)$$

Shown by 9 and 10 in FIG. 1 are a flow meter and a flow control valve, respectively.

EXAMPLE 2

A nonwoven fabric in an electret state was prepared by repeating the procedure of Example 1 except that the ratio of polypropylene A to maleic anhydride modified graft polypropylene B in composition I was changed to 95:5. Filter samples were prepared from this nonwoven fabric. The composition of which the filters were formed contained maleic anhydride in an amount of $6.5 \times 10^{-2}$ mol %.

The filter samples thus prepared had a bulk density of 0.091 g/cm$^3$ and an average surface charge density of $1.4 \times 10^{-9}$ C/cm$^3$; the resin forming the filaments in the fabric had an intrinsic viscosity [η] of 0.57 dl/g and an average fiber diameter of 4 μm. The trapping efficiency of the filters was measured both in the virgin state and after standing in a thermohygrostatic chamber. The results are shown in Table 1.

EXAMPLE 3

A nonwoven fabric in an electret state was prepared by repeating the procedure of Example 1 except that the ratio of polypropylene A to maleic anhydride graft modified polypropylene B in composition I was changed to 90:10. Filter samples were prepared from this nonwoven fabric. The composition of which the filters were formed contained maleic anhydride in an amount of 0.13 mol %.

The filter samples thus prepared had a bulk density of 0.084 g/cm$^3$ and an average surface charge density of $1.1 \times 10^{-9}$ C/cm$^2$; the resin forming the filaments in the fabric had an intrinsic viscosity [$\eta$] of 0.54 dl/g and an average fiber diameter of 4 $\mu$m. The trapping efficiency of the filters was measured both in the virgin state and after standing in a thermohygrostatic chamber. The results are shown in Table 1.

Comparative Example 1

A nonwoven fabric in an electret state was prepared by repeating the procedure of Example 1 except that composition I was replaced by the sole use of polypropylene A. Filter samples were prepared from this nonwoven fabric. The filter samples thus prepared had a bulk density of 0.086 g/cm$^3$ and an average surface charge density of $0.9 \times 10^{-9}$ C/cm$^2$; the resin forming the filaments in the fabric had an intrinsic viscosity [$\eta$] of 0.60 dl/g and an average fiber diameter of 4 $\mu$m. The trapping efficiency of the filters was measured both in the virgin state and after standing in a thermohygrostatic chamber. The results are shown in Table 1.

Comparative Example 2

A nonwoven fabric was prepared by repeating the procedure of Example 1 except that it was not converted to an electret. Filter samples were prepared from this nonwoven fabric. The filter samples thus prepared had a bulk density of 0.085 g/cm$^3$ and an average surface charge density of $0.03 \times 10^{-9}$ C/cm$^2$; the resin forming the filaments in the fabric had an intrinsic viscosity [$\eta$] of 0.58 dl/g and an average fiber diameter of 4 $\mu$m. The trapping efficiency of the filters was measured both in the virgin state and after standing in a thermohygrostatic chamber. The results are shown in Table 1.

3. A nonwoven fabric in an electret state according to claim 1 wherein said polymer composition has an intrinsic viscosity [$\eta$] of 0.3–1.5 dl/g.

4. A nonwoven fabric in an electret state according to claim 1 wherein said polymer composition is at least one member selected from the group consisting of:
(A) a copolymer consisting of a monomer having polar groups and a nonpolar monomer;
(B) a polymer having polar groups introduced into side chains or the backbone chain of a nonpolar polymer by means of oxidation or halogenation;
(C) a graft modified polymer having a polar group containing monomer graft copolymerized onto a nonpolar polymer or said polymer (B); and
(D) a mixture of a nonpolar polymer and at least one member selected from among said polymers (A), (B) and (C).

5. A nonwoven fabric in an electret state according to claim 4 wherein said polar groups are halogen atoms, carbonyl groups, nitro groups and at least one member selected from among the groups represented by the following formulae:

—COOCH$_3$, —COOC$_2$H$_5$, —OCOCH$_3$, —OC$_2$H$_5$,

—OCH$_2$C$_6$H$_5$, —COOH, —OH, —NH$_2$, —CONH$_2$,

—COONH$_4$, $-\underset{\underset{O}{\|}}{C}-NH-\underset{\underset{O}{\|}}{C}-$, $-\underset{\underset{O}{\|}}{C}-O-\underset{\underset{O}{\|}}{C}-$,

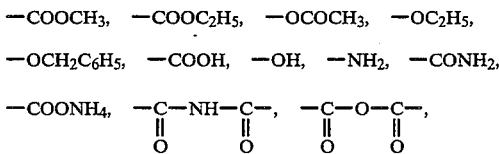

(iii) —O—CH$_2$—CF$_3$.

TABLE 1

| | | polar group | | | | | | trapping efficiency (%) at air velocity of 10 cm/sec. | | |
|---|---|---|---|---|---|---|---|---|---|---|
| | resin | type | content (mol %) | average fiber diameter ($\mu$m) | weight (g/m$^2$) | bulk density (g/cm$^3$) | average surface charge density (C/cm$^2$) | initial | 84 hr* | 305 hr* |
| Ex 1 | PP** | maleic anhydride | 0.039 | 4 | 20 | 0.085 | $1.2 \times 10^{-9}$ | 62.6 | 45.5 | 44.7 |
| Ex 2 | PP | maleic anhydride | 0.065 | 4 | 20 | 0.091 | $1.4 \times 10^{-9}$ | 76.6 | 63.2 | 62.8 |
| Ex 3 | PP | maleic anhydride | 0.13 | 4 | 20 | 0.084 | $1.1 \times 10^{-9}$ | 59.5 | 49.8 | 48.9 |
| CEx 1 | PP | none | | 4 | 20 | 0.086 | $0.9 \times 10^{-9}$ | 44.4 | 22.7 | 20.5 |
| CEx 2 | PP | maleic anhydride | 0.039 | 4 | 20 | 0.085 | $0.03 \times 10^{-9}$ | 10.7 | — | — |

*) Trapping Efficiency after leaving in a thermohygrostatic chamber (80° C., 90% RH)
**) PP: polypropylene

What is claimed is:

1. A nonwoven fabric in an electret state that is composed of monofilaments of a polymer composition that contains no more than 1 mol % of polar groups, said monofilaments having an average fiber diameter of 0.5–100 $\mu$m and said nonwoven fabric having a weight of 5–100 g/m$^2$, a bulk density of 0.05–0.40 g/cm$^3$ and an average surface charge density of at least $0.1 \times 10^{-9}$ C/cm$^2$.

2. A nonwoven fabric in an electret state according to claim 1 wherein a content of said polar groups in said polymer composition is 0.03–0.1 mol %.

6. A nonwoven fabric in an electret state according to claim 4 wherein said polymer composition contains both a polar group containing polymer and a nonpolar polymer.

7. A nonwoven fabric in an electret state according to claim 6 wherein said polar group containing polymer contains polar groups in an amount of no more than 3 mol %.

8. A nonwoven fabric in an electret state according to claim 1 wherein said polymer composition is a polyolefin that has been modified with at least one modifying monomer as selected from among unsaturated carboxylic acids and derivatives thereof.

9. A nonwoven fabric in an electret state according to claim 8 wherein said polymer composition contains said modifying monomer in an amount of no more than 1 mol %.

10. A nonwoven fabric in an electret state according to claim 8 wherein said modified polyolefin is a modified polypropylene.

11. A nonwoven fabric in an electret state according to claim 8 wherein said modified polyolefin contains 98-40 wt % of polypropylene (a) and 2-60 wt % of an ethylene-α-olefin copolymer (b) having a crystallinity of less than 40% as measured with X-rays, with the sum of (a) and (b) being 100 wt %.

12. A nonwoven fabric in an electret state according to claim 1 wherein said polymer composition contains not only a polyolefin that has been modified with at least one modifying monomer as selected from among unsaturated carboxylic acids and derivatives thereof but also an unmodified polyolefin.

13. A nonwoven fabric in an electret state according to claim 12 wherein said unmodified polyolefin is polypropylene.

14. A nonwoven fabric in an electret state according to claim 12 wherein said unmodified polyolefin contains 98-40 wt % of polypropylene (a) and 2-60 wt % of an ethylene-α-olefin copolymer (b) having a crystallinity of less than 40% as measured with X-rays, with the sum of (a) and (b) being 100 wt %.

15. A process for producing a nonwoven fabric in an electret state, which comprises the steps of forming a polymer composition containing no more than 1 mol % of polar groups into a nonwoven fabric by a melt-blow method and then applying a DC voltage to the nonwoven fabric to create electrets.

16. A process according to claim 15 wherein said polymer composition is a polyolefin that has modified with at least one modifying monomer as selected from among unsaturated carboxylic acids and derivatives thereof.

17. A process according to claim 15 wherein said polymer composition contains not only a polyolefin that has been modified with at least one modifying monomer as selected from among unsaturated carboxylic acids and derivatives thereof but also an unmodified polyolefin.

18. A filtering material that is composed of a nonwoven fabric in an electret state as recited in claim 1.

19. An air masking material that is composed of the nonwoven fabric in an electret state as recited in claim 1.

* * * * *